United States Patent
Brixius et al.

(10) Patent No.: US 7,131,523 B2
(45) Date of Patent: Nov. 7, 2006

(54) TRANSPORT SYSTEM, IN PARTICULAR AN AIRPORT LUGGAGE TRANSPORT SYSTEM

(75) Inventors: Wolfgang Brixius, Neunkirchen A.Br (DE); Dominik Gräfer, Dortmund-Wellinghofen (DE); Albrecht Hoene, Lappersdorf (DE)

(73) Assignee: Siemens Aktiengesellschaft, München (DE)

(*) Notice: Subject to any disclaimer, the term of this patent is extended or adjusted under 35 U.S.C. 154(b) by 148 days.

(21) Appl. No.: 10/935,715

(22) Filed: Sep. 7, 2004

(65) Prior Publication Data

US 2005/0056528 A1    Mar. 17, 2005

(30) Foreign Application Priority Data

Sep. 4, 2003    (DE) ................... 103 40 867

(51) Int. Cl.
*B65G 25/00*    (2006.01)
(52) U.S. Cl. ............... 198/465.2; 198/465.3; 198/842
(58) Field of Classification Search ............. 198/465.2, 198/465.3, 842
See application file for complete search history.

(56) References Cited

U.S. PATENT DOCUMENTS

| | | | |
|---|---|---|---|
| 3,753,485 A | | 8/1973 | Fromme et al. |
| 4,014,428 A | * | 3/1977 | Ossbahr .................... 198/345.3 |
| 5,388,684 A | * | 2/1995 | Peck ........................ 198/465.1 |
| 6,176,367 B1 | * | 1/2001 | Patrito ......................... 198/817 |
| 6,540,064 B1 | | 4/2003 | Bodewes et al. |
| 7,004,301 B1 | * | 2/2006 | Brixius et al. ........... 198/465.2 |
| 7,048,109 B1 | * | 5/2006 | Brixius et al. ........... 198/465.3 |
| 2002/0063037 A1 | | 5/2002 | Bruun et al. |
| 2005/0072653 A1 | * | 4/2005 | Brixius et al. ......... 198/370.06 |

FOREIGN PATENT DOCUMENTS

| | | |
|---|---|---|
| DE | 197 07 321 A1 | 8/1998 |
| DE | 197 08 390 C2 | 9/1998 |
| DE | 699 03 284 T2 | 6/2003 |
| EP | 0 858 961 A2 | 8/1998 |

* cited by examiner

*Primary Examiner*—Joe Dillon, Jr.
(74) *Attorney, Agent, or Firm*—Henry M. Feiereisen

(57) ABSTRACT

A transport system, in particular an airport luggage transport system, and guide means for a transport system of this type, for transporting individual items, are disclosed. The items are transported along a transport path with at least one straight section, with support elements for supporting a bottom side of the containers. The bottom side of the containers includes at least one straight guiding element in the form of a groove-shaped recess extending in a transport direction and having two opposing side faces. To accurately and securely guide the containers, guiding means with lateral guiding rollers engage with the side faces of the groove-shaped recesses.

13 Claims, 4 Drawing Sheets

TRANSPORT SYSTEM, IN PARTICULAR AN AIRPORT LUGGAGE TRANSPORT SYSTEM

CROSS-REFERENCES TO RELATED APPLICATIONS

This application claims the priority of German Patent Application, Serial No. 103 40 867.3, filed Sep. 4, 2003, pursuant to 35 U.S.C. 119(a)–(d), the disclosure of which is incorporated herein by reference.

BACKGROUND OF THE INVENTION

The invention is directed to a transport system, in particular an airport luggage transport system.

U.S. published application 2002/0063037 A1 discloses a transport system for transporting containers that transport individual items, for example luggage, along a transport path. The transport path has a plurality of straight sections, with both sides of the bottom sides of the containers resting on conveyor belts. The containers are oriented and guided by sidewalls.

Disadvantageously, this conventional conveyor system is not able to safely and controllably guide the containers. This is particularly disadvantageous when containers are to be x-rayed by an x-ray unit arranged along the transport path.

DE 197 07 321 A1 discloses a conveyor system for containers which moves the containers along a transport path. The containers are moved by conveyor belts formed as revolving flat endless belts which are guided over deflection wheels. One container side rests on a conveyor belt that transfers a driving force to the container; the other container side is supported by freely rotatable support rollers. The containers are guided by a guiding rail that cooperates with a corresponding pin-shaped guiding element disposed on the bottom side of the containers. The guiding element is guided in the guiding rail while also preventing the container from lifting off the transport path. The containers are guided by two lateral sides of the guiding rail extending in the transport direction, which also prevents a transverse motion of the containers.

DE 699 03 284 T2 discloses a transport system for transporting goods, for example luggage items, at airports, whereby the items are arranged in containers that are moved along a transport path by drive means in the form of a conveyor belt. The conveyor belt includes straight guiding rails for the containers. The guiding rails guide a container by engaging with a groove disposed between webs on the bottom side of the container.

In addition, DE 197 08 390 C2 discloses a rail-bound floor transport system with floor transport units having rotatably supported wheels that roll on a textile surface which is disposed on a rail member and hence forms the running surface for the wheels. The running surfaces are bounded on the inside by elongated flat lateral guides. Guiding rollers with vertical rotation axes that are rotatably supported on the bottom side of the floor transport units roll on the inside running surfaces. The two running surfaces are located slightly above the base of the rail member due to the thickness of the textile surfaces, so that the guiding rollers for lateral guiding the floor transport units extend below the running surfaces.

It would therefore be desirable and advantageous to provide an improved device for controllably, securely and "gently" guiding the containers in the transport system, which obviates prior art shortcomings and is able to specifically accurately orient the containers and the individual items.

SUMMARY OF THE INVENTION

According to one aspect of the invention, a transport system, in particular an airport luggage transport system, for containers adapted to transport individual items along a transport path with at least one straight section, includes support elements for supporting a bottom side of the containers, with the bottom side of the containers including at least one straight guiding element in the form of a groove-shaped recess extending in a transport direction and having two opposing side faces. The system further includes guiding means arranged on the transport path for orienting and guiding the containers by engaging with the groove-shaped recess. The guiding means have longitudinal sides which each include at least one lateral guiding element engaging with the opposing side faces for supporting the containers. The lateral guiding elements are implemented as lateral guiding rollers that roll along the longitudinal sides of the groove-shaped recess and protrude from the longitudinal sides.

The guiding means include at least one groove-shaped recess formed in the container, in which the straight guiding element engages. The lateral guiding elements are implemented as lateral guiding rollers that are arranged in the guiding element and roll on the side faces of the groove and protrude from the longitudinal sides. The lateral guiding rollers roll on the two opposing side faces of the groove of the container, which forcibly guides the containers in a controlled and secure manner.

Because the containers are controllably and firmly guided, an x-ray unit can be arranged, for example, alongside the straight section of the transport path for x-raying the individual items including the containers.

In one particularly simple embodiment, the system can include conveyor belts, whereby the bottom side of the containers can rest directly on the conveyor belts which are supported by the support elements.

The guiding accuracy can be further improved if at least one of the longitudinal sides includes a pair of lateral guiding rollers spaced in the transport direction.

A further improvement can be achieved by spacing of the pair of lateral guiding rollers so as to substantially be equal to the length of the container.

The forces guiding the containers are independent of the container weight and the weight of the transported items, which enables greater acceleration and deceleration forces to be transmitted for example, when the lateral guiding rollers are driven.

The guiding means can include a low-friction plastic or a metal sheet to guide the containers more securely and gently.

The configuration can be more easily adapted to a variety of transport systems by implementing the support elements as side rails with end pieces, with belt guiding rollers being supported for rotation in the end pieces. The conveyor belt runs over the belt guiding rollers, whereby the transport section of the conveyor belt is located on the top side of a side rail and the return section of the conveyor belt is located on a bottom side of the side rail.

The design can be simplified by configuring the end pieces so that they can be pushed onto or inserted into the side rails.

The length of the transport element can be easily changed by adding an extension piece that can be pushed onto or inserted into the side rails for extending the side rails. The end piece can then be pushed onto or inserted into the extension piece.

The belt can be easily changed by providing the belt guiding rollers with a crowned shape, so that the conveyor belt can be more easily installed and removed manually.

In a simple embodiment of the containers, the groove-shaped recess can located centrally in the bottom side of the containers.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
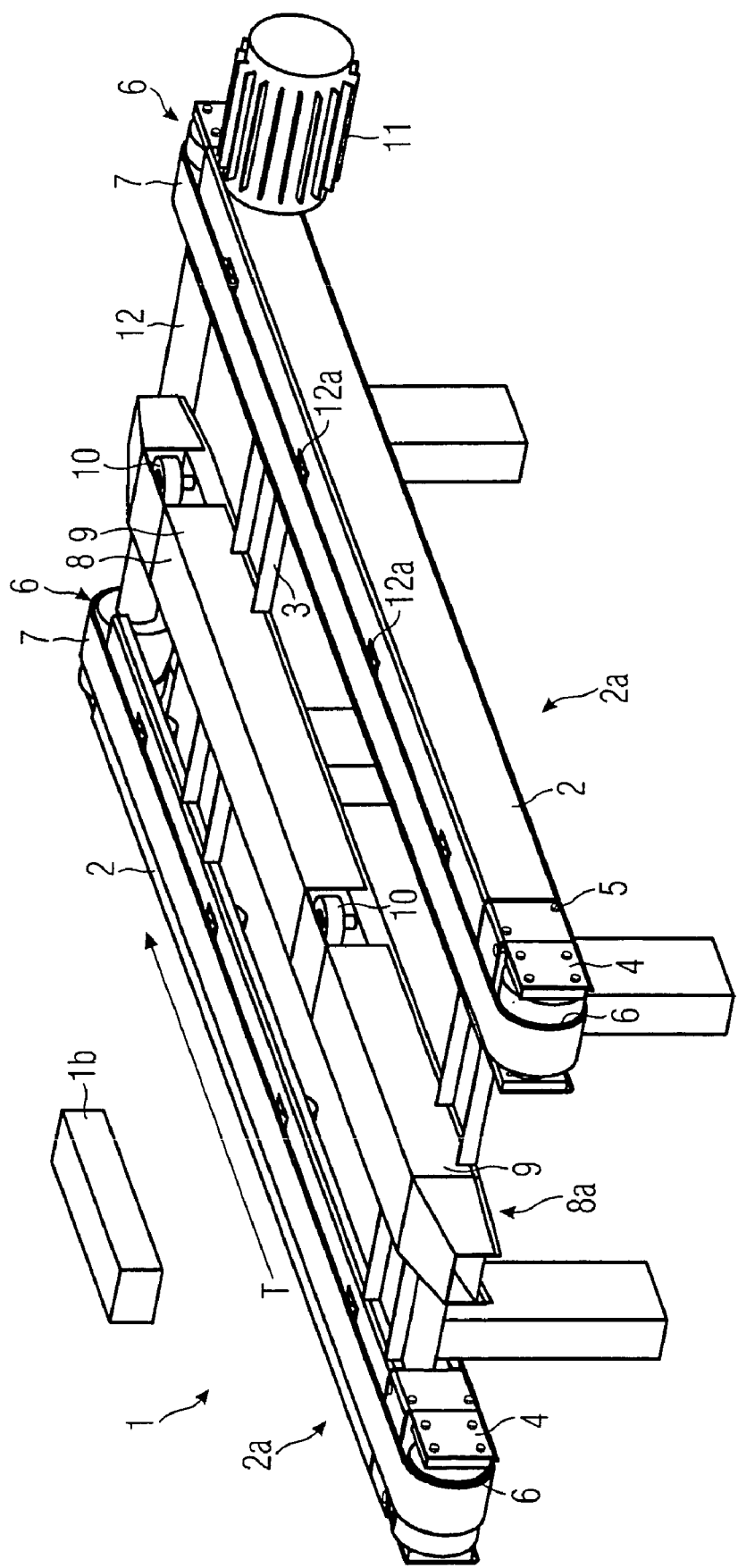
FIG. 1 shows a transport unit of a straight transport path segment of a transport system.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a transport unit 1 forming a straight transport path segment of an airport luggage transport system (not shown). The luggage transport system is designed to transport individual items which are transported in containers 1a (see FIG. 2) in a transport direction T. An x-ray unit 1b is provided for x-raying the individual items, including the containers 1a.

The transport unit 1 has two mutually parallel side rails 2 that are connected with each other by transverse rails 3. An end piece 4 is inserted into each of the two front ends of the side rails 2, in the direction of the view of FIG. 1, and secured on the side rail 2 with screws 5. The end pieces 4 so connected with the side rails 2 form each a respective end of the two side rails 2.

The four ends of the side rails 2 support rotatably supported crowned belt guiding rollers 6, over which an endless conveyor belt 7 moves. The flat bottom sides of the containers 1a rest during the transport on the two conveyor belts 7 and are thus supported by the side rails 2; the side rails 2 hence operate as support elements 2a. The guiding portion of the conveyor belt 7 is here located on the top side and the return portion of the conveyor belt 7 is located on the bottom side of the side rail 2.

A guiding element 8 is part of a guiding means 8a located midway between the two side rails 2 and extending parallel to the side rails 2 in the transport direction T. The guiding element 8 is made of a low-friction plastic, but can also be the made of a metal sheet. The guiding element 8 has a rectangular cross-section, whereby the ends are slightly tapered in the transport direction.

As shown in FIG. 1, a pair of lateral guiding rollers 10 is provided on each of the two longitudinal sides 9 of the guiding element 8, operating as lateral guiding elements (FIG. 1 only shows the two front lateral guiding rollers 10 facing the viewer; the rear lateral guiding roller pair in FIG. 1 is obscured from view by the guiding element 8). The lateral guiding elements can also be made of low-friction plastic spheres and the like. The lateral guiding rollers 10 protrude slightly over the lateral side faces of the longitudinal sides 9. The distance between the two lateral guiding roller pairs 10, 10 corresponds approximately to the container length. As schematically shown in FIG. 1, the two rear belt guiding rollers 6 are driven by a motor, of which only the drive pinion 11 is shown. A shaft 12 which non-rotatably supports the two rear belt guiding rollers 6 is driven by the drive pinion 11. It will be understood that the lateral rollers 10 can also be driven and operate as drive means.

The friction of the conveyor belts can be reduced by providing in the side rails 2 freely rotatable support rollers 12a supporting the conveyor belts 7.

Figure 2:
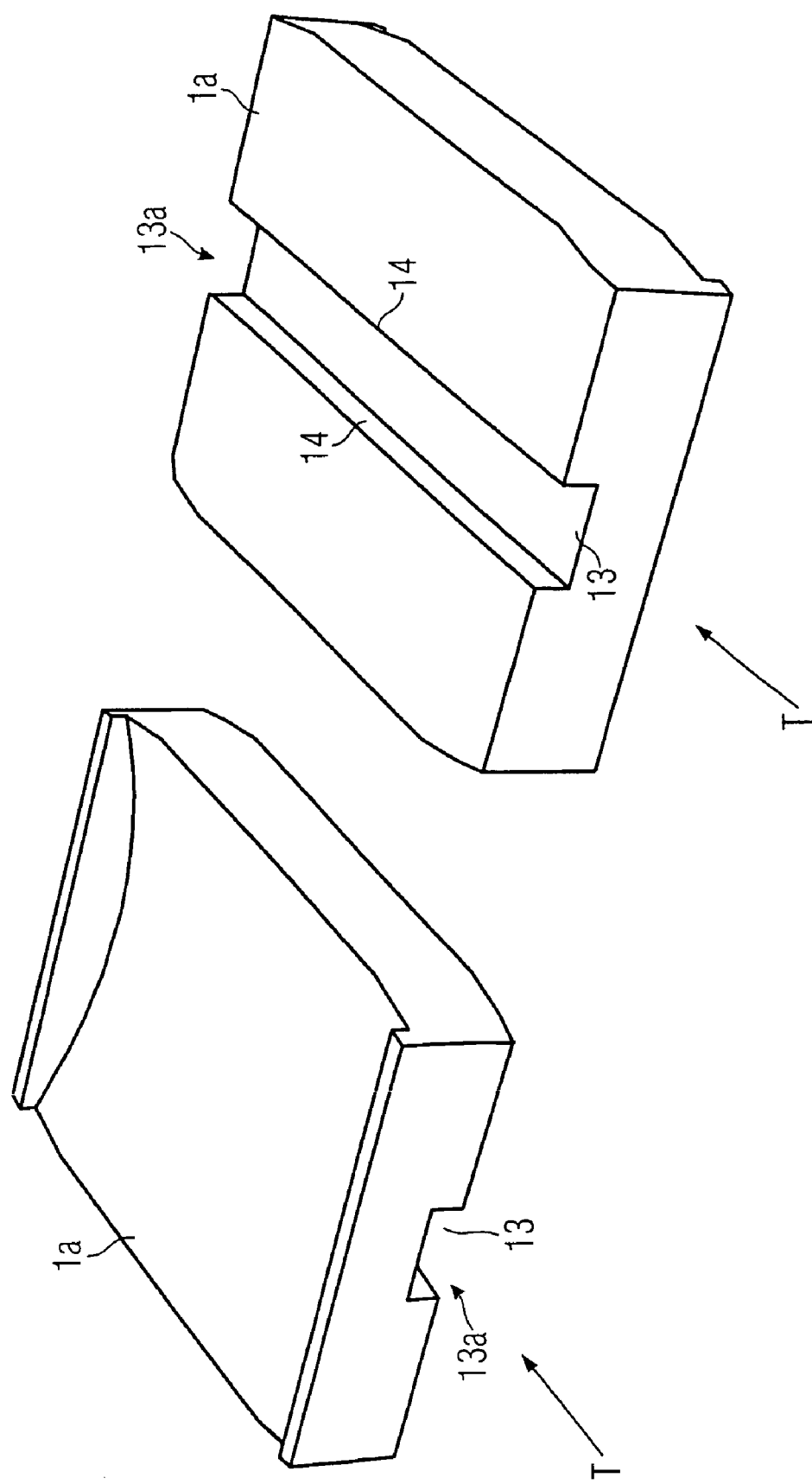
FIG. 2 shows a container suitable for the transport unit of FIG. 1.

The left-hand side of FIG. 2 shows on a top view of a container 1a, whereas the right-hand side of FIG. 2 shows a bottom view. A longitudinal groove 13 with two opposing side surfaces 14 and extending in the transport direction is formed as a recess 13a in the bottom side. When passing over the conveyor unit 1, the guiding element 8 engages with the longitudinal groove 13, causing the lateral guiding rollers 10 to roll on the two opposing side surfaces 14 of the groove.

The two roller pairs 10, 10 in FIG. 1 are arranged in the rear section of the guiding element 8, as seen in the transport direction T. In this way, an incoming container 1a is initially coarsely oriented and guided by the guiding element 8, and thereafter finely aligned by the lateral guiding rollers 10.

This transport unit 1 can therefore be easily used with an x-ray unit 1b.

Figure 3:
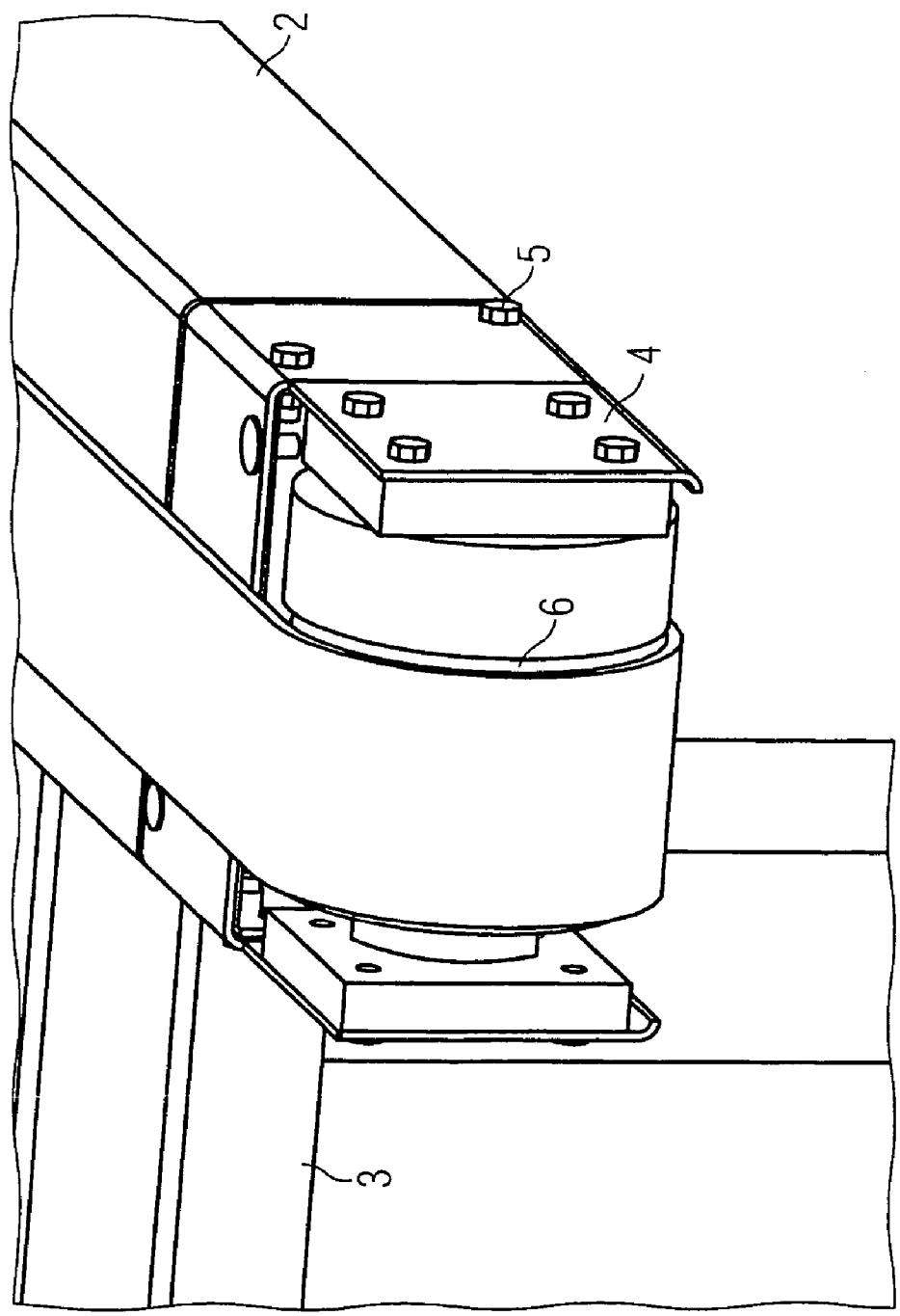
FIG. 3 shows an end region of a side rail of the transport unit of FIG. 1 with an end piece.

FIG. 3 shows in an enlarged view the end of the right side rail 2 with an inserted end piece 4.

Figure 4:
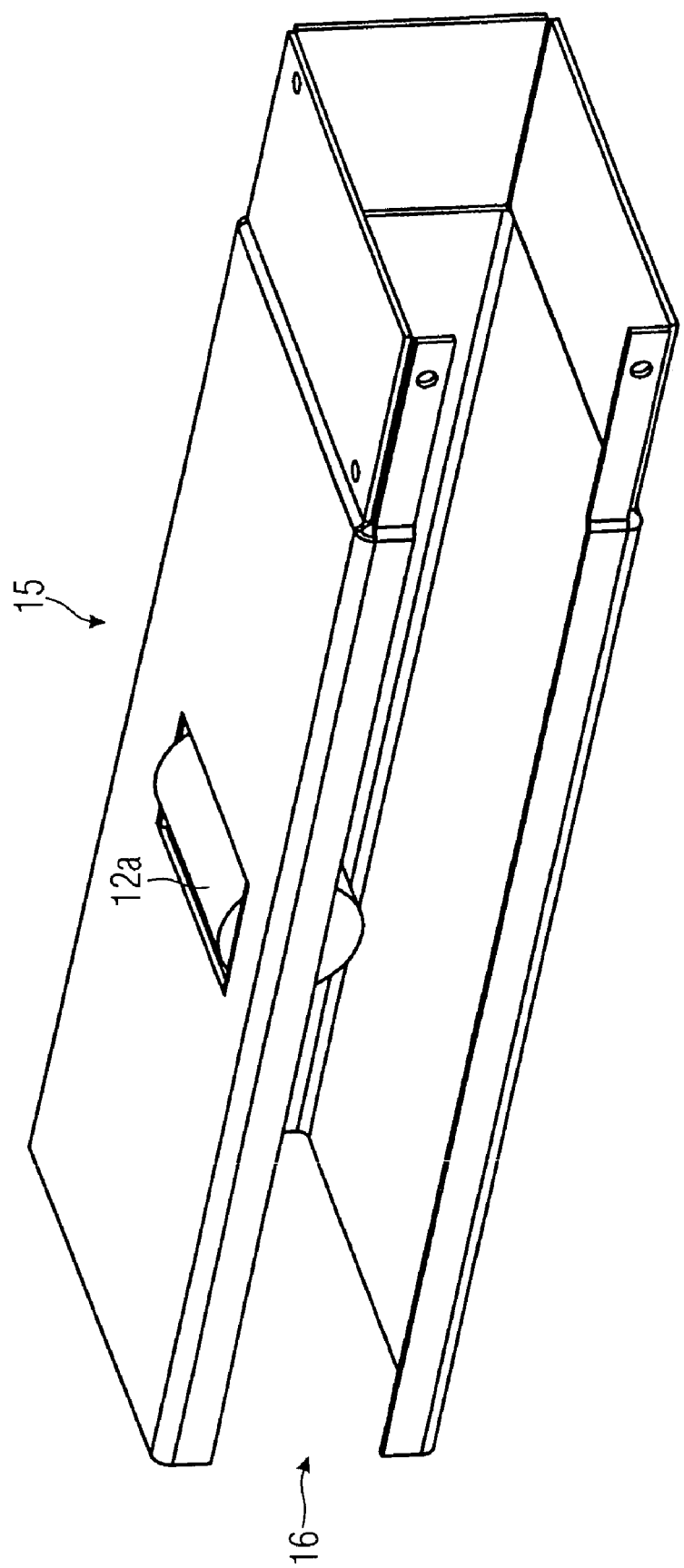
FIG. 4 shows an extension piece for extending the side rail of FIG. 2.

FIG. 4 shows an extension piece 15 that can be used for extending a side rail 2. The extension piece 15 can be inserted into the end of the side rail 2 instead of the end piece 4 by first loosening the screws 5 and pulling the end piece 4 from the end of the side rail 2. The extension piece 15 can be secured to the side rail 2 with screws. The end piece 4 is then inserted into the free opening 16 of the extension piece 15 and also secured to the end piece 15 with screws 5.

As a result of the crowned shape of the belt guiding rollers 6, the conveyor belt 7 can be easily removed and installed again by hand.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A transport system for containers adapted to transport individual items along a transport path having at least one straight section, comprising:
   a container having a bottom side which includes at least one straight guiding element in the form of a groove-shaped recess, said groove-shaped recess extending in a transport direction and having two opposing side faces;
   support elements for supporting the bottom side of the container; and
   guiding means arranged on the transport path for orienting and guiding the container by engaging with the groove-shaped recess, said guiding means having longitudinal sides which each include at least one lateral guiding element engaging with the opposing side faces for guiding the container;
   wherein the lateral guiding elements are implemented as lateral guiding rollers that rollingly contact the longitudinal sides of the groove-shaped recess and protrude from the longitudinal sides.

2. A transport system for containers adapted to transport individual items along a transport path having at least one straight section, comprising:
   a container having a bottom side which includes at least one straight guiding element in the form of a groove-shaped recess, said groove-shaped recess extending in a transport direction and having two opposing side faces;
   support elements for supporting the bottom side of the container;
   guiding means arranged on the transport path for orienting and guiding the container by engaging with the groove-shaped recess, said guiding means having longitudinal sides which each include at least one protruding lateral guiding roller which rollingly engages with the opposing side faces; and
   an x-ray unit arranged along the at least one straight section of the transport path for x-raying the individual items including the container.

3. The transport system of claim 1, further comprising a conveyor belt, with the bottom side of the container directly resting on the conveyor belt, said conveyor belt being supported by the support elements.

4. The transport system of claim 1, wherein at least one of the longitudinal sides includes a pair of lateral guiding rollers that have a spacing in the transport direction.

5. The transport system of claim 4, wherein the spacing of the pair of lateral guiding rollers is substantially equal to a length of the container.

6. The transport system of claim 4, wherein the lateral guiding rollers are driven.

7. The transport system of claim 1, wherein the guiding means comprises a low-friction plastic or a metal sheet.

8. The transport system of claim 3, wherein the support elements comprise side rails having two ends, each of the two ends having an end piece, and belt guiding rollers supported for rotation in the end pieces, with the conveyor belt running over the belt guiding rollers, and a transport section of the conveyor belt arranged on a top side of a side rail and a return section of the conveyor belt arranged on a bottom side of the side rail.

9. The transport system of claim 8, wherein the end pieces are held in or on the side rails by a press fit.

10. The transport system of claim 8, further including an extension piece for extending the side rails, with a corresponding end piece being applied to an end of the extension piece and held in or on the end of the extension piece by a press fit.

11. The transport system of claim 8, wherein the belt guiding rollers are crowned.

12. The transport system of claim 1, wherein the groove-shaped recess is located centrally in the bottom side of the container.

13. The transport system of claim 1, wherein the transport system is an airport luggage transport system.

* * * * *